(12) United States Patent
Fiello et al.

(10) Patent No.: US 11,506,155 B2
(45) Date of Patent: Nov. 22, 2022

(54) ENGINE CONTROL UNIT COOLING AIR BOX

(71) Applicant: K&N Engineering, Inc., Riverside, CA (US)

(72) Inventors: Jonathan Richard Fiello, Riverside, CA (US); Steve Williams, Cherry Valley, CA (US)

(73) Assignee: K&N Engineering, Inc., Riverside, CA (US)

( * ) Notice: Subject to any disclaimer, the term of this patent is extended or adjusted under 35 U.S.C. 154(b) by 0 days.

(21) Appl. No.: 16/172,769

(22) Filed: Oct. 27, 2018

(65) Prior Publication Data

US 2020/0132026 A1    Apr. 30, 2020

(51) Int. Cl.
*F02M 35/024* (2006.01)
*B01D 46/00* (2022.01)

(52) U.S. Cl.
CPC ....... *F02M 35/0245* (2013.01); *B01D 46/001* (2013.01); *F02M 35/02425* (2013.01); *F02M 35/02483* (2013.01); *B01D 2271/02* (2013.01); *B01D 2275/201* (2013.01); *B01D 2279/60* (2013.01)

(58) Field of Classification Search
CPC ......... F02M 35/0245; F02M 35/02425; F02M 35/02483; B01D 46/001; B01D 2271/02; B01D 2275/201; B01D 2279/60

USPC ...................................................... 123/198 E
See application file for complete search history.

(56) References Cited

U.S. PATENT DOCUMENTS

| 2003/0142481 | A1* | 7/2003 | Kinoshita | ........... B60R 16/0239 |
| | | | | 361/719 |
| 2010/0304232 | A1* | 12/2010 | Huecker | ................ B01D 46/12 |
| | | | | 429/410 |
| 2014/0049102 | A1* | 2/2014 | Li | ......................... H01L 23/433 |
| | | | | 307/9.1 |
| 2019/0078539 | A1* | 3/2019 | Kwak | ............... F02M 35/02483 |
| 2019/0168154 | A1* | 6/2019 | Knight | ............... F02M 35/0201 |

* cited by examiner

*Primary Examiner* — Yi-Kai Wang
(74) *Attorney, Agent, or Firm* — Rutan & Tucker LLP; Hani Z. Sayed

(57) ABSTRACT

An apparatus and a method are provided for an air box configured to cool an engine control unit (ECU) by way of an airstream being communicated to an air intake system of an internal combustion engine of a vehicle. The air box is comprised of a housing to support an air filter within an interior of the housing. An opening in the housing fixedly receives at least one surface of the ECU to transfer heat from the ECU to the airstream. A mount portion within the housing receives the air filter. A conduit to a clean side of the air filter is configured to be coupled with the air intake system. An inlet to the housing is configured to couple with an air inlet duct of the vehicle so as to direct the airstream into the interior of the housing.

15 Claims, 4 Drawing Sheets

ENGINE CONTROL UNIT COOLING AIR BOX

FIELD

The field of the present disclosure generally relates to filtration devices. More particularly, the field of the present disclosure relates to an apparatus and a method for an air box that exhibits a reduced resistance to an intake airstream and may be coupled with an engine control unit so as to cool the engine control unit by way of the intake airstream.

BACKGROUND

An engine control unit (ECU) is a type of electronic control unit that controls a series of actuators on an internal combustion engine to ensure optimal engine performance. The ECU receives data from a multiplicity of sensors within the engine bay, interprets the data by way of multidimensional performance maps referred to as "lookup tables," and adjusts the engine actuators accordingly. Typically, the ECU controls the fuel mixture, ignition timing, variable cam timing, and emissions of the vehicle. In many instances, the ECU also interacts with a transmission controller, as well as many systems that are essential to operation of the engine, including an anti-lock braking system, a traction system, a stability control system, a climate control module, and an anti-theft system.

Although the electronic components inside the ECU generally are fairly robust, malfunctions may occur. For example, shorts in sensor circuits may overload and damage the ECU. In some instances, problems with voltages supplied to the ECU by a power supply or damaged ground connections may cause the ECU to malfunction. Further, corrosion, excessive heat, and vibration may also can cause harm to the ECU.

An ECU mounted within an engine by of the vehicle operates in a particularly hot and hostile environment, necessitating cooling of the ECU so as to avoid malfunction of the internal electronic components due to overheating. In addition, any heat generated within the ECU may further shorten the life of the ECU if the heat is not transferred away. Cooling of ECUs typically is achieved by way of liquid cooling, air cooling, or conduction of heat away from the ECU.

Heat conduction cooled ECUs may include a heat exchanger, commonly referred to as a "chill plate," that is configured to support and cool the ECU. The chill plate may be comprised of a coolant chamber that receives fuel flowing from a fuel tank to the engine. The chill plate conducts heat from the ECU to the fuel flowing through the coolant chamber before the fuel is routed to the engine.

Air-cooled ECUs typically include a multiplicity of cooling fins disposed on an exterior of the ECU and configured to transfer heat from the ECU to a passing airstream. For example, FIG. 1 illustrates an exemplary ECU 100 that is configured to be air-cooled. The ECU 100 is comprised of a housing 104 that encloses and protects electronic components within the housing. Typically, the housing 104 is comprised of a rigid material, such as metal, that is suitable to withstand the operating conditions within the engine bay. Sockets 108 facilitate electrically coupling the electronic components within the ECU 100 with the actuators, sensors, and systems of the vehicle. Feet 112 may be coupled with the housing 104 and configured to support the ECU 100 within the engine bay. In the illustrated embodiment of FIG. 1, the feet 112 are disposed on a bottom surface of the ECU 100. In other embodiments, however, the feet 112 may be disposed on any suitable surface of the ECU 100, as needed. Further, multiple holes 116 may be disposed in the feet 112, as well other locations of the housing 104, to facilitate mounting the ECU 100 within the engine bay. As will be recognized, the holes 116 are configured to receive hardware fasteners for fastening the ECU 100 within the engine bay.

In the illustrated embodiment of FIG. 1, the ECU 100 comprises a multiplicity of cooling fins 120 disposed on opposite side surfaces of the housing 104. Thus, the ECU 100 may be situated in any suitable location within the engine bay whereby the airstream is directed through the multiplicity of cooling fins 120 and removes heat from the ECU 100. Frequently, the ECU 100 is coupled with the engine such that the multiplicity of cooling fins 120 are exposed to a cooling airstream within the engine bay.

What is desired, however, is an air box that exhibits a reduced resistance to the intake airstream and may be coupled with an ECU so as to provide cooling to the ECU by way of the intake airstream.

SUMMARY

An apparatus and a method are provided for an air box configured to cool an engine control unit (ECU) by way of an airstream being communicated through an air filter to an air intake system of an internal combustion engine of a vehicle. The air box is comprised of a housing configured to support the air filter within an interior of the housing. An opening in the housing is configured to fixedly receive at least one surface of the ECU so as to place the surface into direct contact with the airstream. A mount portion is disposed within the housing and configured to receive a base of the air filter. In some embodiments, the air filter may be of a flangeless variety, and thus the mount portion may be comprised of a flat surface that receives a compressible seal disposed on the base of the air filter. A conduit comprising an opening to an interior of the air filter is configured to be coupled with the air intake system. An inlet to the housing is configured to direct the airstream from an air inlet duct of the vehicle to the interior of the housing and the air filter.

In an exemplary embodiment, an air box configured to cool an engine control unit (ECU) by way of an airstream being communicated through an air filter to an air intake system of an internal combustion engine of a vehicle comprises a housing configured to support the air filter within an interior of the housing; an opening in the housing configured to fixedly receive at least one surface of the ECU; a mount portion disposed within the housing and configured to receive an air filter; a conduit comprised of an opening to a clean side of the air filter and configured to be coupled with the air intake system; and an inlet to the housing that is configured to couple with an air inlet duct of the vehicle so as to direct the airstream into the interior of the housing.

In another exemplary embodiment, the mount portion is comprised of a flat surface that is configured to receive a seal disposed at a base of the air filter, a multiplicity of suitable fasteners being used to compress the seal and establish an airtight connection between an interior of the air filter and the mount portion. In another exemplary embodiment, the mount portion is comprised of a flange that extends into the interior of the housing and is configured to be received into an opening in a base of the air filter.

In another exemplary embodiment, the conduit is comprised of a transition and a flange that is configured to receive the air intake system, the transition comprising a molded connection between the flange and the housing. In another exemplary embodiment, the transition positions a longitudinal dimension of the flange at an offset relative to the housing, a value of the offset depending upon the particular vehicle, as well as the specific configuration of the engine, for which the ECU cooling air box is to be utilized. In another exemplary embodiment, the transition positions a longitudinal dimension of the flange at an angle relative to the housing, a value of the angle depending upon the particular vehicle, as well as the specific configuration of the engine, for which the ECU cooling air box is to be utilized.

In another exemplary embodiment, the opening comprises an edge portion that is configured to receive and place the at least one surface into direct contact with the airstream. In another exemplary embodiment, the edge portion is configured to receive a multiplicity of fasteners so as to fixedly attach the ECU to the housing. In another exemplary embodiment, a multiplicity of threaded holes are disposed in suitable locations within the edge portion to receive the multiplicity of fasteners. In another exemplary embodiment, the edge portion is configured to receive feet of the ECU, such that a portion of the at least one surface between the feet effectively encloses the interior of the housing. In another exemplary embodiment, a gasket is disposed between the at least one surface and the edge portion so as to provide an airtight coupling between housing and the ECU.

In an exemplary embodiment, a method for an air box configured to cool an engine control unit (ECU) by way of an airstream being communicated through an air filter to an air intake system of an internal combustion engine of a vehicle comprises configuring a housing that is comprised of a mount portion to support the air filter within an interior of the housing; extending a conduit from the mount portion to couple with the air intake system, the conduit comprising an opening to an interior of the air filter; forming an inlet to the interior of the housing to couple with an air inlet duct of the vehicle; and forming an opening in the housing to receive at least one surface of the ECU, such that the at least one surface substantially encloses the interior of the housing.

In another exemplary embodiment, forming an opening further comprises configuring an edge portion of the opening to receive the at least one surface, such that the at least one surface is placed into direct contact with the airstream. In another exemplary embodiment, configuring the edge portion further comprises disposing a multiplicity of threaded holes in suitable locations within the edge portion to receive a multiplicity of fasteners to fixedly attach the ECU to the housing. In another exemplary embodiment, configuring the edge portion further comprises fabricating a gasket to be disposed between the at least one surface and the edge portion to provide an airtight coupling between housing and the ECU.

BRIEF DESCRIPTION OF THE DRAWINGS

The drawings refer to embodiments of the present disclosure in which.

Figure 1:
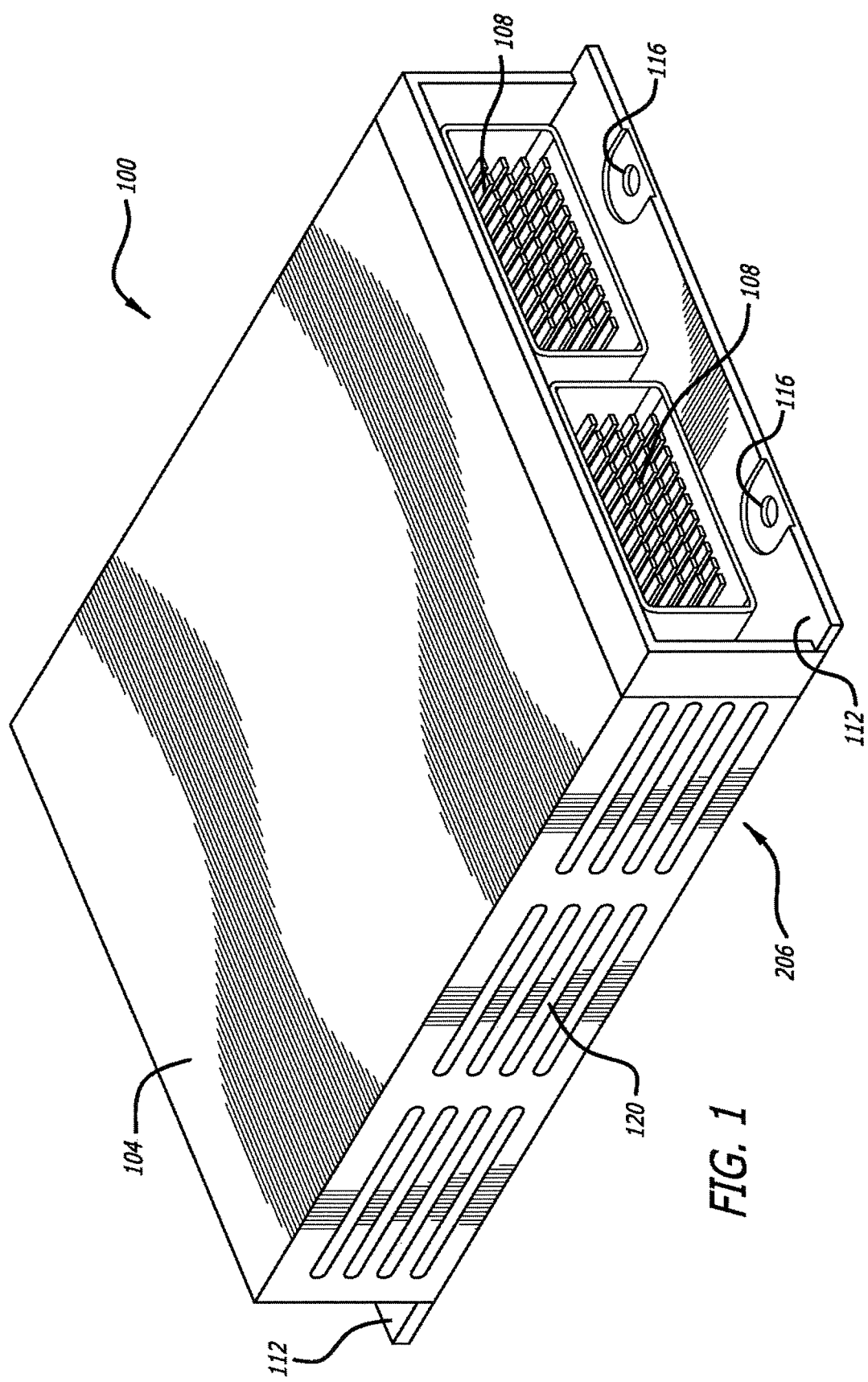
FIG. 1 illustrates an upper perspective view of an exemplary engine control unit (ECU) that may be air-cooled by way of a multiplicity of cooling fins.

While the present disclosure is subject to various modifications and alternative forms, specific embodiments thereof have been shown by way of example in the drawings and will herein be described in detail. The invention should be understood to not be limited to the particular forms disclosed, but on the contrary, the intention is to cover all modifications, equivalents, and alternatives falling within the spirit and scope of the present disclosure.

DETAILED DESCRIPTION

In the following description, numerous specific details are set forth in order to provide a thorough understanding of the present disclosure. It will be apparent, however, to one of ordinary skill in the art that the invention disclosed herein may be practiced without these specific details. In other instances, specific numeric references such as "first filter medium," may be made. However, the specific numeric reference should not be interpreted as a literal sequential order but rather interpreted that the "first filter medium" is different than a "second filter medium." Thus, the specific details set forth are merely exemplary. The specific details may be varied from and still be contemplated to be within the spirit and scope of the present disclosure. The term "coupled" is defined as meaning connected either directly to the component or indirectly to the component through another component. Further, as used herein, the terms "about," "approximately," or "substantially" for any numerical values or ranges indicate a suitable dimensional tolerance that allows the part or collection of components to function for its intended purpose as described herein.

In general, the present disclosure describes an apparatus and a method for an air box to cool an engine control unit (ECU) by way of an airstream being drawn through an air filter to an air intake system of an internal combustion engine of a vehicle. The air box is comprised of a housing configured to support the air filter within an interior of the housing. An opening in the housing is configured to fixedly receive at least one surface of the ECU so as to place the surface into direct contact with the airstream. An edge portion of the opening is configured to receive feet of the ECU, such that a portion of the surface between the feet effectively encloses the interior of the housing. A gasket may be disposed between the surface and the edge portion so as to provide an airtight coupling between housing and the ECU. In some embodiments, the air filter may be flangeless, and a mount portion may be comprised of a flat surface that receives a compressible seal disposed on the base of the air filter. A conduit comprising an opening to an interior of the air filter is configured to be coupled with the air intake system. An inlet to the housing is configured to couple with an air inlet duct of the vehicle so as to direct the airstream into the interior of the housing and to the air filter.

Although embodiments of the invention may be described and illustrated herein in terms of a cone-shaped air filter, it should be understood that embodiments of this invention are not limited to the exact shape illustrated, but rather may include a wide variety of generally enclosed shapes, such as cylindrical, circular, oval, round, curved, conical, or any other closed perimeter shape, that provide a relatively large surface area in a given volume of the filter. Moreover, embodiments as described herein are not limited to use as internal combustion engine filters, but rather may have applicability in other filtration systems in which a large volume of air requires treatment.

Figure 2:
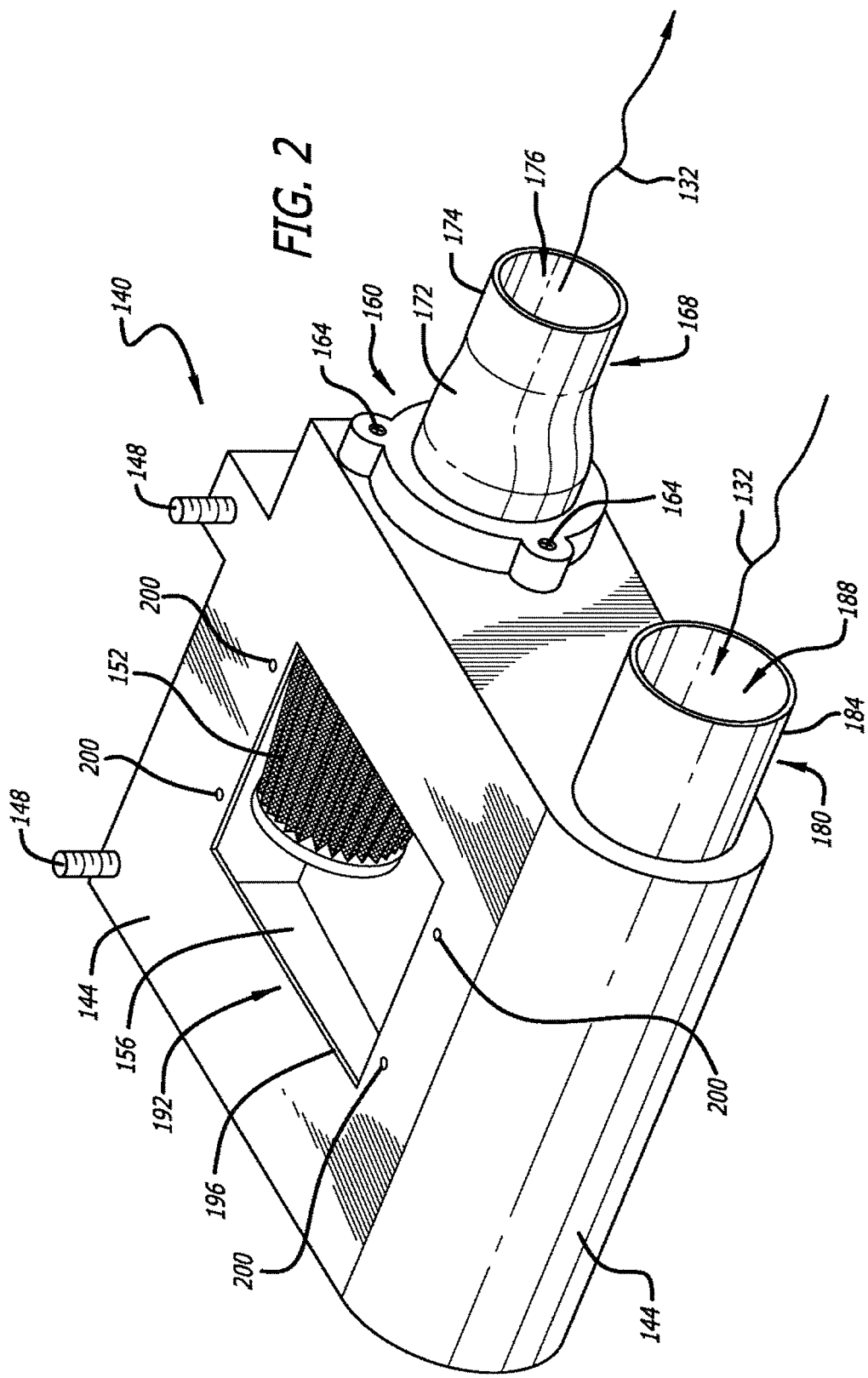
FIG. 2 illustrates a lower perspective view of an exemplary embodiment of an ECU cooling air box that is configured to transfer heat from an ECU to an airstream being drawn into an air intake system of an internal combustion engine, according to the present disclosure.

FIG. 2 illustrates a lower perspective view of an exemplary embodiment of an engine control unit (ECU) cooling air box 140 that is configured to transfer heat from an ECU, such as the ECU 100, to an airstream 132 being filtered and drawn into an air intake system of an internal combustion engine. The ECU cooling air box 140 is comprised of a housing 144 and one or more supports 148 disposed on an exterior of the housing. The housing 144 preferably is comprised of a material that is sufficiently durable and temperature resistant to retain its configuration during installation and operation when coupled with the air intake system. In some embodiments, the housing 144 may be formed by way of injection molding. The ECU cooling air box 140 generally is of an enclosed variety and is configured to improve airflow through an air filter 152 disposed within an interior 156 of the housing 144. The interior 156 generally is characterized by smooth surfaces and rounded edges so as to decrease turbulence and air resistance through the air intake system, thereby improving engine performance beyond that otherwise possible with conventional air boxes.

The supports 148 generally are configured to be coupled with, or fastened to, the interior of an engine bay of a vehicle. In some embodiments, the supports 148 are configured to couple the ECU cooling air box 140 directly with the internal combustion engine of the vehicle. It is envisioned that the supports 148 may include any suitable fastening means to facilitate installing the ECU cooling air box 140 in the engine bay, such as, by way of example, suitably designed holes, brackets, molded shaped portions, protrusions, extensions, straps, hardware fasteners, or other any similar device for holding the ECU cooling air box 140 fixed within the engine bay. As will be appreciated, the particular fastening means will vary according to the specific make, model, and type of the vehicle with which the ECU cooling air box 140 is to be used.

The housing 144 is configured to support the air filter 152 and provide an interface between the air filter and an air intake of the engine. A front side of the housing 144 is comprised of a mount portion 160 that is configured to facilitate coupling the air filter 152 with an interior surface of the front side of the housing. In some embodiments, the air filter 152 may be of a flangeless variety, and thus the base may include a compressible seal. In the embodiment illustrated in FIG. 2, the mount portion 160 is comprised of a flat surface that receives a seal disposed at a base of the air filter 152. A multiplicity of fasteners 164, or other suitable hardware, may be used to compress the seal between the base of the air filter 152 and the flat surface, thereby establishing an airtight connection between an interior 166 of the air filter 152 and the mount portion 160. Further details about components comprising the base of the air filter 152, including seals disposed thereon, are disclosed in U.S. patent application Ser. No. 15/276,502, entitled "Flangeless Air Filter," filed on Sep. 26, 2016, the entirety of which is incorporated herein by reference. In some embodiments, however, the mount portion 160 may be comprised of a suitably sized flange or conduit that extends into the interior 156 and is configured to be received into an opening in the base of the air filter 152. It is contemplated that the mount portion 160 may be comprised of any coupling means suitable for forming a reasonably tight connection between the air filter 152 and the mount portion 160.

Figure 4:
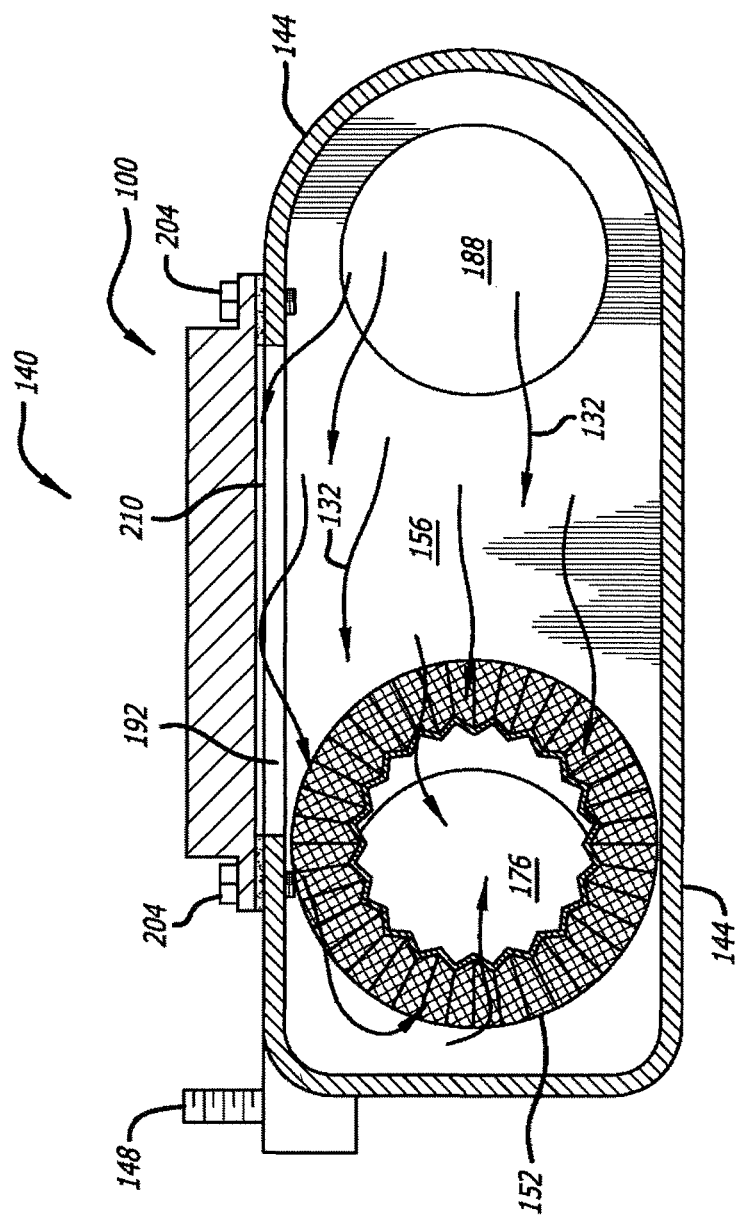
FIG. 4 illustrates a cross-sectional view of the ECU cooling air box of FIG. 3, taken along a line 4-4, in accordance with the present disclosure.

As shown in FIGS. 2 and 4, the mount portion 160 places the interior 166 of the air filter 152 into fluid communication with a conduit 168 that is configured to be coupled with an air intake conduit, or duct, extending to the air intake of the engine. The conduit 168 is comprised of a transition 172 and a flange 174 that is configured to receive the air intake duct of the engine. Preferably, the transition 172 provides a molded connection between the flange 174 and the housing 144, although other forms of connections may be apparent to those skilled in the art. In the embodiment of FIG. 2, the transition 172 generally positions a longitudinal dimension of the flange 174 at an offset with respect to a center of the mount portion 160. In some embodiments, the transition 172 may position the longitudinal dimension of the flange 174 at an angle relative to the housing 144. In some embodiments, the angle between the conduit 168 and the housing 144 may be 90-degrees. In general, however, the value of the angle between the conduit 168 and the housing 144 depends upon the particular vehicle, as well as the specific configuration of the engine, for which the ECU cooling air box 140 is to be utilized. As such, any value of the angle of the conduit 168 may be incorporated into the ECU cooling air box 140 without detracting from the present disclosure.

The flange 174 comprises an opening 176 that is configured to conduct the airstream 132 drawn into the interior 166 of the air filter 152 to the air intake duct of the engine. It should be understood that the flange 174 has a configuration and an exterior diameter, and the opening 176 has an inner diameter that are suitable to accept the air intake duct of the engine. As shown in FIG. 2, the transition 172 may taper the exterior diameter of the conduit 168, extending from the mount portion 160 to a suitable exterior diameter of the flange 174. Moreover, in some embodiments, the flange 174 may comprise any of various additional ridges, raised portions, or other surface features so as to optimally engage with the air intake duct of the engine. The specific configuration of the flange 174 and the inner diameter of the opening 176 depend upon the particular make, model, and type of the engine for which the ECU cooling air box 140 is to be utilized, and thus a wide variety of configurations and diameters may be incorporated into the conduit 168 without limitation.

With continuing reference to FIG. 2, the housing 144 further comprises an inlet conduit 180 that is configured to direct the airstream 132 into the interior 156 before the airstream is passed through the air filter 152 and into the air intake duct of the engine by way of the conduit 168. Similar to the conduit 168, the inlet conduit 180 is comprised of a flange 184 having an opening 188 suitable for communicating the airstream 132. In some embodiments, the inlet conduit 180 may be further comprised of a transition that offsets and/or angles a longitudinal dimension of the flange 184 with respect to the housing 144. Further, the transition may be configured to change in diameter nearer to the housing 144. As discussed in connection with the conduit 168, the flange 184 has a configuration and an exterior diameter, and the opening 188 has an inner diameter that are suitable to be coupled with existing air intake ducting within the engine bay of the vehicle. As such, any of various additional bends, ridges, raised portions, or other surface features may be incorporated into the flange 184 so as to optimally engage with the air intake ducting of the vehicle. Moreover, the specific configuration of the flange 184 and the inner diameter of the opening 188 will depend upon the particular make, model, and type of the engine for which the ECU cooling air box 140 is to be utilized.

Figure 3:
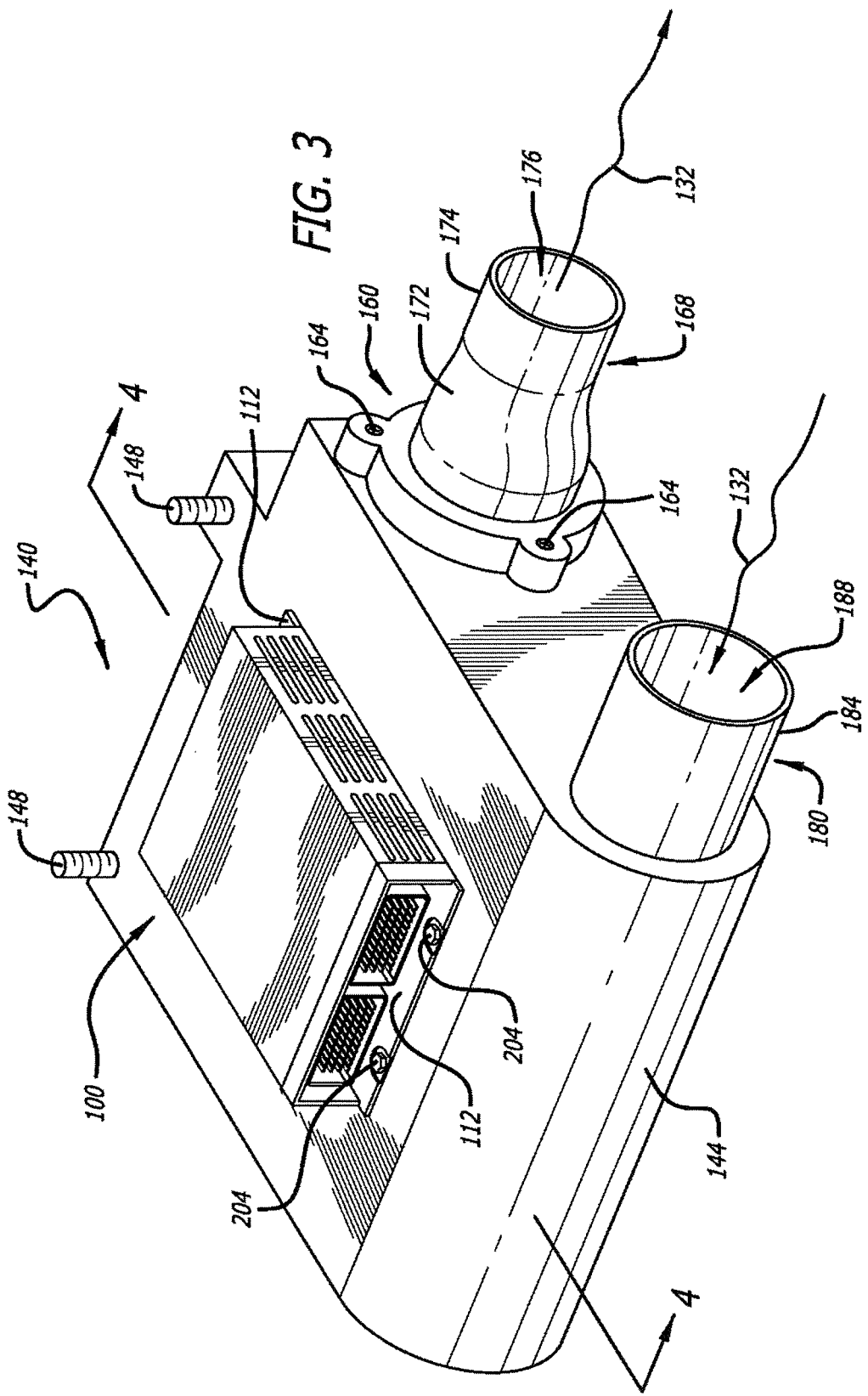
FIG. 3 illustrates a lower perspective view of the ECU cooling air box of FIG. 2 coupled with the exemplary ECU illustrated in FIG. 1, in accordance with the present disclosure.

As shown in FIG. 2, the housing 144 comprises an opening 192 into the interior 156. The opening 192 comprises an edge portion 196 that is configured to be coupled with a flat surface of an ECU, such as the ECU 100. Preferably, the edge portion 196 is configured to receive a multiplicity of fasteners so as to fixedly attach the ECU 100 to the housing 140, as shown in FIG. 3. In the embodiment illustrated in FIG. 2, a multiplicity of threaded holes 200 are disposed in suitable locations within the edge portion 196 to threadably receive fasteners 204 positioned in the holes 116 of the ECU 100. As will be appreciated, however, any of various fastening means other than the fasteners 204 may be utilized to attach the ECU 100 to the edge portion 196, without limitation.

The edge portion 196 generally is configured to receive the feet 112 of the ECU 100, such that the flat surface of the ECU 100, between the feet 112, is placed into direct contact with the airstream 132. It is envisioned that the flat surface is suitable for transferring heat away from the electronic components within the ECU 100. In the embodiment illustrated in FIGS. 3-4, the feet 112 are coupled with the edge portion 196, such that a bottom surface 206 of the ECU 100 between the feet 112 effectively encloses the interior 156 of the housing 144. A gasket 210 may be disposed between the bottom surface 206 and the edge portion 196 so as to provide an airtight coupling between housing 144 and the ECU 100. The bottom surface 206 of the ECU 100 is placed into direct contact with the airstream 132, such that the airstream 132 transfers heat away from the ECU 100 before being drawn through the air filter 152 and into the air intake duct of the engine.

It is contemplated that the opening 192 facilitates removing the air filter 152 from the ECU cooling air box 140, as needed. In one embodiment, a method for removing the air filter 152 comprises loosening and removing the fasteners 204 and then gently moving the ECU 100 away from the opening 192 to provide access to the interior 156 of the housing 144. The fasteners 164 may then be loosened to release the base of the air filter 152 from the mount portion 160. Once the fasteners 164 are removed, the air filter 152 may be removed from the interior 156 by way of the opening 192.

Although the method for removing the air filter 152 generally facilitates replacing the air filter, when dirty, with a new air filter, it is contemplated that the method for removing the air filter 152 is particularly advantageous for use with embodiments of the air filter that are configured to be periodically cleaned and reused. For example, in some embodiments, the air filter 152 may be comprised of multiple layers of cotton gauze that are sandwiched between two wire screens that are co-pleated along with a filter medium of the air filter 152. The cotton gauze may be advantageously treated with a suitably formulated filter oil composition that causes tackiness throughout microscopic strands comprising the filter medium. The nature of the cotton allows high volumes of airflow, and when combined with the tackiness of the filter oil composition creates a powerful filtering medium which ensures a high degree of air filtration. Further details about components comprising the air filter 152, as well as details about the filter oil composition, are disclosed in U.S. patent application Ser. No. 14/181,678, entitled "Air Box With Integrated Filter Media," filed on Feb. 16, 2014, and U.S. patent application Ser. No. 14/701,163, entitled "Filter Oil Formulation," filed on Apr. 30, 2015, the entirety of each of which is incorporated herein by reference.

It is contemplated that a practitioner may clean the air filter 152 by first removing from the air filter 152 from the housing 144, as described above. In some embodiments, wherein the air filter 152 comprises a filter oil composition, the practitioner may use a solvent to remove the filter oil from the air filter. The practitioner may clean the air filter 152 by inserting a water hose through the base and into the interior 166 of the air filter 152 and then spraying water so as to flush contaminants from the air filter. In some embodiments, the practitioner may clean the air filter 152 by spraying water onto the exterior of the air filter, such that the water and contaminants are flushed directly from the exterior of the air filter. Other cleaning methods will be apparent to those skilled in the art without deviating from the spirit and scope of the present disclosure.

While the invention has been described in terms of particular variations and illustrative figures, those of ordinary skill in the art will recognize that the invention is not limited to the variations or figures described. In addition, where methods and steps described above indicate certain events occurring in certain order, those of ordinary skill in the art will recognize that the ordering of certain steps may be modified and that such modifications are in accordance with the variations of the invention. Additionally, certain of the steps may be performed concurrently in a parallel process when possible, as well as performed sequentially as described above. To the extent there are variations of the invention, which are within the spirit of the disclosure or equivalent to the inventions found in the claims, it is the intent that this patent will cover those variations as well. Therefore, the present disclosure is to be understood as not limited by the specific embodiments described herein, but only by scope of the appended claims.

What is claimed is:

1. An air box configured to cool an engine control unit (ECU) by way of an airstream being communicated to an air intake system of an internal combustion engine of a vehicle, comprising:
    a housing configured to support an air filter within an interior of the housing;
    an opening in the housing configured to fixedly receive at least one surface of the ECU such that the ECU is external relative to the housing;
    a mount portion disposed within the housing and configured to receive an air filter;
    a conduit to direct the airstream out of the air box, wherein the conduit is comprised of an opening to a clean side of the air filter and configured to be coupled with the air intake system;
    an inlet to the housing that is configured to couple with an air inlet duct of the vehicle so as to direct the airstream into the interior of the housing; and
    wherein the conduit and the inlet are parallel to each other and disposed on a same surface of the housing.

2. The air box of claim 1, wherein the mount portion is comprised of a flat surface that is configured to receive a seal disposed at a base of the air filter, wherein at least one of a multiplicity of fasteners is used to compress the seal and establish an airtight connection between an interior of the air filter and the mount portion.

3. The air box of claim 1, wherein the mount portion is comprised of a flange that extends into the interior of the housing and is configured to be received into an opening in a base of the air filter.

4. The air box of claim 1, wherein the conduit is comprised of a transition and a flange that is configured to receive the air intake system, the transition comprising a molded connection between the flange and the housing.

5. The air box of claim 4, wherein the transition positions a longitudinal dimension of the flange at an offset relative to the housing, a value of the offset depending upon the particular vehicle, as well as the specific configuration of the engine, for which the ECU cooling air box is to be utilized.

6. The air box of claim 4, wherein the transition positions a longitudinal dimension of the flange at an angle relative to the housing, a value of the angle depending upon the particular vehicle, as well as the specific configuration of the engine, for which the ECU cooling air box is to be utilized.

7. The air box of claim 1, wherein the opening comprises an edge portion that is configured to receive and place the at least one surface into direct contact with the airstream.

8. The air box of claim 7, wherein the edge portion is configured to receive a multiplicity of fasteners so as to fixedly attach the ECU to the housing.

9. The air box of claim 8, wherein a multiplicity of threaded holes are disposed in locations within the edge portion to receive the multiplicity of fasteners.

10. The air box of claim 8, wherein the edge portion is configured to receive feet of the ECU, such that a portion of the at least one surface between the feet effectively encloses the interior of the housing.

11. The air box of claim 10, wherein a gasket is disposed between the at least one surface and the edge portion so as to provide an airtight coupling between housing and the ECU.

12. A method for an air box configured to cool an engine control unit (ECU) by way of an airstream being communicated through an air filter to an air intake system of an internal combustion engine of a vehicle, comprising:

configuring a housing that is comprised of a mount portion to support the air filter within an interior of the housing;

extending a conduit from the mount portion to couple with the air intake system, the conduit comprising an opening to an interior of the air filter, wherein the conduit is configures to direct the airstream out of the air box;

forming an inlet to the interior of the housing to couple with an air inlet duct of the vehicle;

forming an opening in the housing to receive at least one surface of the ECU, such that the at least one surface substantially encloses the interior of the housing and such that the ECU is external relative to the housing, and wherein the conduit and the inlet are parallel to each other and disposed on a same surface of the housing.

13. The method of claim 12, wherein forming an opening further comprises configuring an edge portion of the opening to receive the at least one surface, such that the at least one surface is placed into direct contact with the airstream.

14. The method of claim 13, wherein configuring the edge portion further comprises disposing a multiplicity of threaded holes in locations within the edge portion to receive a multiplicity of fasteners to fixedly attach the ECU to the housing.

15. The method of claim 13, wherein configuring the edge portion further comprises fabricating a gasket to be disposed between the at least one surface and the edge portion to provide an airtight coupling between housing and the ECU.

\* \* \* \* \*